F. W. KING.
EYE PROTECTING DEVICE.
APPLICATION FILED SEPT. 13, 1917.
1,285,225.
Patented Nov. 19, 1918.
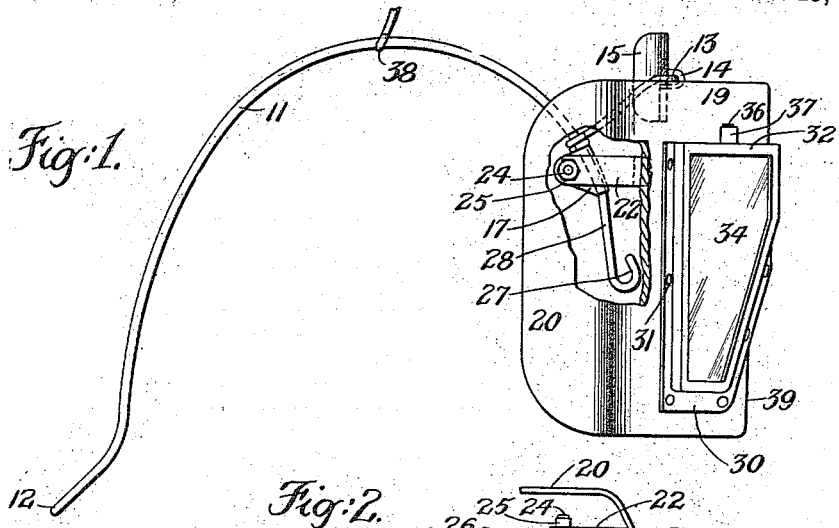
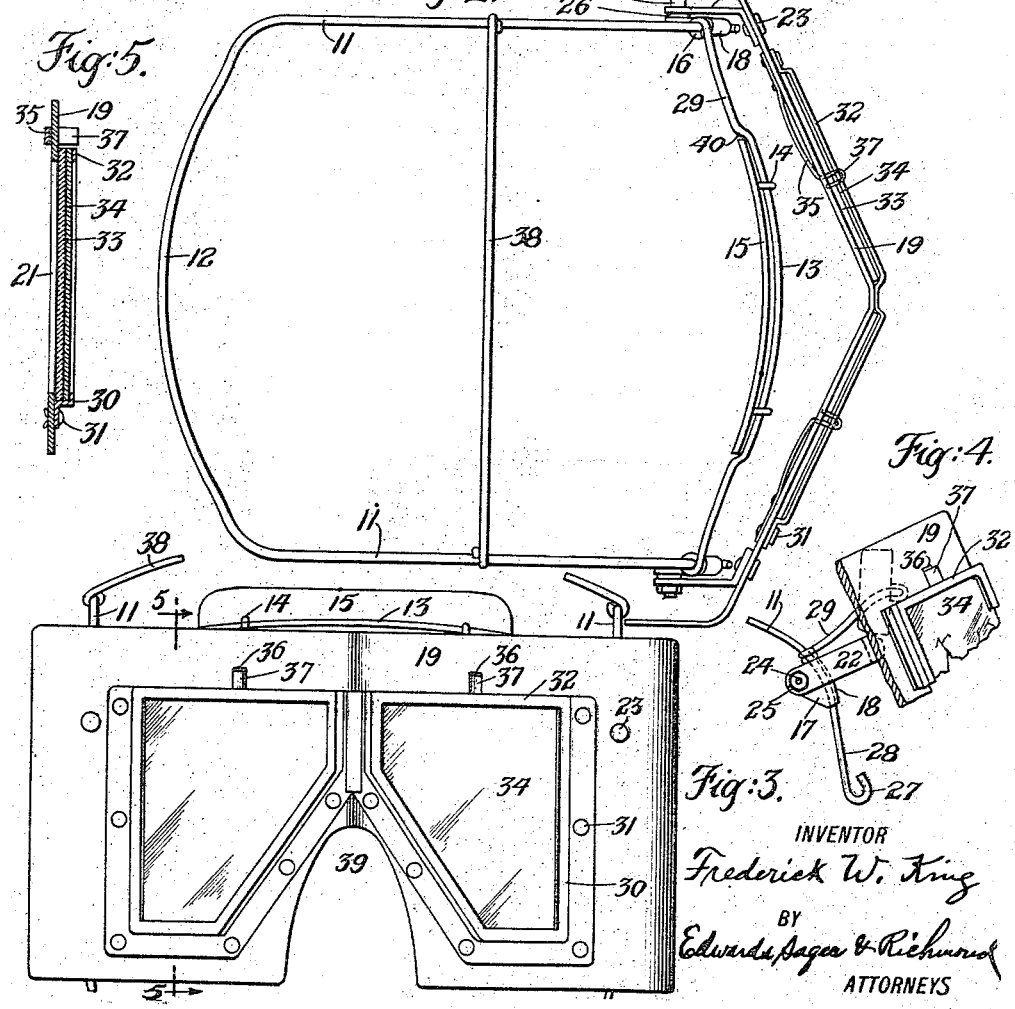
INVENTOR
Frederick W. King
BY
Edwards, Sager & Richmond
ATTORNEYS

UNITED STATES PATENT OFFICE.

FREDERICK W. KING, OF NEW YORK, N. Y., ASSIGNOR TO JULIUS KING OPTICAL COMPANY, A CORPORATION OF NEW YORK.

EYE-PROTECTING DEVICE.

1,285,225.

Specification of Letters Patent.

Patented Nov. 19, 1918.

Application filed September 13, 1917. Serial No. 191,108.

*To all whom it may concern:*

Be it known that I, FREDERICK W. KING, a citizen of the United States, residing at New York, in the county of New York and State of New York, have invented certain new and useful Improvements in Eye-Protecting Devices, of which the following is a specification.

The principal object of my invention is to provide a convenient and useful eye-protecting screen to be worn by men operating acetylene torches and by others under circumstances requiring protection to the eyes. Another object of my invention is to provide an eye protecting screen that can be conveniently displaced for unobstructed vision when desired. Another object of my invention is to provide such a screen that shall be rugged in use, also readily adjustable to the head of the wearer. All these objects and others will be made apparent in the following specification and claims taken in connection with the accompanying drawings, in which one specific embodiment of my invention has been illustrated. It will be understood that modifications can be made that will fall within the scope of the invention. I now proceed to describe the particular embodiment of my invention which is shown in the drawings.

Figure 1 is a side elevation partly broken away to show parts that would otherwise be concealed;

Fig. 2 is a top plan view;

Fig. 3 is a front elevation;

Fig. 4 is a fragmentary side elevation corresponding to Fig. 1, but showing a changed adjustment of the parts; and Fig. 5 is a vertical section on the line 5—5 of Fig. 3 looking in the direction of the arrow.

A head frame is made by a wire bent to form the side portions 11 and the back portion 12. Another wire 38 goes across the top of the head of the wearer and a front wire 13 has its ends 16 fastened near the front ends of the side wires 11. The front wire 13 carries a forehead piece 15 connected by the eyelets 14 so as to permit the piece 15 to oscillate and adjust itself to the forehead of the wearer. The abrupt bends 40 in the wire 13 prevent lateral displacement of the piece 15, and the wire 13 may be bent by pliers at 29 to give further adjustment to the head of the wearer. The whole head frame may be bent in the same way so as to get a correct fit to the head of the wearer. Near their front ends the two side wires 11 have brazed thereto at 18 the lugs 17 which support the pivot pins 24.

The frame for the eye protecting screen is designated 19 and is made of refractory fiber or other sheet material that can be shaped as shown. The sides are bent as at 20 to prevent light from getting to the eyes, as from another workman with a torch beside the wearer of this device. The two large five-sided openings 21 of the shape shown in Fig. 3 are provided to facilitate vision therethrough. The brackets 22 are fastened by the rivets 23 to the frame 19 and their ends engage the pivot pins 24 already mentioned and are secured by the nuts 25. On the pivot pins 24 are the friction washers 26 and the nuts 24 are clamped tight enough so that any angular adjustment of the parts on the pivot pins 24 will be maintained against a moderate application of force but will yield to an excessive force.

The extreme front ends of the side wires 11 are bent around to form stops 27 to limit the downward angular adjustment of the screen 19. The portions of the wires 11 between the stops 27 and the lugs 17 can be bent with pliers as at 28 to adjust the stop position.

Around the bottom and sides of each eye opening 21 is a spaced flange 30 secured by rivets 31 forming a pocket to receive the transparent medium. This pocket is further completed by the piece 32 across the top. The transparent medium consists of an inner darkened glass plate 33 and a thin outer mica sheet 34. The leaf spring 35 has its end 37 adapted to form a retaining catch projecting through the hole 36. The screen frame 19 is cut away at 39 for the nose of the wearer.

The entire device as just described will be seen to consist of two principal parts, the head frame and the screen pivotally connected thereto. The head frame is adjustable by bending so that it fits firmly on the head of the wearer. In normal operative position, the screen will be in its lowermost position against the stops 27, which prevent it from resting on the nose of the wearer. In this position, the wearer will have a wide range of vision through the glass and mica members 33 and 34, and if he is operating an acetylene torch, his eyes will be protected both from the excessive light and from spattering molten metal. When the torch is extinguished or at any other time, if he wishes unobstructed vision, he simply pushes up on the frame 19, rotating it to the position indicated in Fig. 4, when he can look out under the screen frame as he would under the visor of a cap. At no point does the screen come in contact with his face, so that there is ventilation for his face under the screen and there is no tendency to obstruct the flow of perspiration on any part of his face. The outer mica sheets 34 protect the glass from spattering metal and can readily be renewed when desired. For renewing either the mica sheets 34 or the glass plate 33, the catches 37 are withdrawn and the parts can be slipped out and in with the utmost facility. The parts of the head frame that are close to the head are behind the screen so that they will not be uncomfortably heated by the heat radiated from the torch or other work.

I claim:—

1. In combination, a head frame and a frame for an eye protecting screen pivoted thereon and comprising a sheet of rigid material with two eye openings therethrough, said sheet being flat around each of said openings but bent between them and notched at the bend for the nose of the wearer, and with wings bent farther back at the sides beyond the openings, and flat pieces of transparent material across said openings.

2. In combination, a head frame and an eye protecting screen, said frame comprising a wire bent to form the sides and back and with another wire fastened across the front carrying a forehead piece by a loose connection permitting said piece to adjust itself angularly to the forehead of the wearer.

3. In combination, a wire head frame carrying two pivot pins, a flat piece of refractory sheet material bent to a dihedral angle to form an eye protecting screen and two brackets fixed thereon and rotatably mounted on said pivot pins.

4. In combination, a frame adapted to be fixed on the head of the wearer, pivot pins carried thereby, one on each side at the front, and a flat piece of refractory sheet material bent to a dihedral angle to form an eye protecting screen mounted to turn on said pivots.

5. In combination, a wire head frame carrying two pivot pins, and an eye protecting screen mounted to turn thereon, a portion of the wire of said head frame being extended past one of the pivot pins so that its end forms a stop to limit the movement of said screen.

6. In combination, a frame adapted to be fixed on the head of the wearer, pivot pins carried thereby, one on each side at the front, a flat piece of refractory sheet material bent to a dihedral angle to form an eye protecting screen mounted to turn on said pivots, and a stop carried by said frame to limit the movement of said screen.

7. In combination, a head frame and an eye protecting screen, said frame comprising a wire bent to form the sides and back and having its ends brought forward to act as stops, pivot pins carried by said wire back of said ends, and an eye protecting screen mounted on said pins and adapted at one adjustment to engage said stops.

8. In combination, in an eye protecting device, a frame of heat resisting, non-heat-conducting material having two eye openings and cut away at its middle part to go over the nose of the wearer and bent back on each side, the axis of the bend being up and down above the cut away place, a head frame to be fixed on the head of the wearer to carry said first-mentioned frame, and transparent members across said eye openings.

9. In combination, a head frame and an eye protecting screen, said frame comprising a wire bent to form the sides and back and having its ends brought forward to act as stops, pivot pins carried by said wire back of said ends, and an eye protecting screen mounted on said pins and adapted at one adjustment to engage said stops, said stops being adjustable by bending the same.

10. In combination, a frame adapted to be fixed on the head of the wearer, pivot pins carried thereby, one on each side at the front, an eye protecting screen deeply notched at the middle on its lower edge to go over the nose of the wearer, and brackets on the inner side of said screen and engaging said pivot pins, said screen extending beyond said brackets and back of them and spaced from them so as to protect the brackets and the pivot pins from a source of heat at the front of the wearer.

FREDERICK W. KING.